United States Patent
Sitaram et al.

(10) Patent No.: US 9,179,380 B1
(45) Date of Patent: Nov. 3, 2015

(54) METHOD OF PERFORMING HANDOVER IN A WIRELESS COMMUNICATION NETWORK

(71) Applicant: Sprint Spectrum LP, Overland Park, KS (US)

(72) Inventors: Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 138 days.

(21) Appl. No.: 14/133,393

(22) Filed: Dec. 18, 2013

(51) Int. Cl.
| | |
|---|---|
| *H04L 12/28* | (2006.01) |
| *H04W 4/00* | (2009.01) |
| *H04W 36/00* | (2009.01) |
| *G06F 13/14* | (2006.01) |
| *H04W 36/08* | (2009.01) |

(52) U.S. Cl.
CPC ........................................ *H04W 36/08* (2013.01)

(58) Field of Classification Search
CPC ........... H04W 4/02; H04W 4/04; H04W 8/10; H04W 24/00; H04W 24/02; H04W 24/04; H04W 24/08; H04W 28/02; H04W 28/0289; H04W 28/10; H04W 28/16; H04W 28/18; H04W 28/20; H04W 28/24; H04W 36/00; H04W 36/0005; H04W 36/0011; H04W 36/0027; H04W 36/0033; H04W 36/0055; H04W 36/0061; H04W 36/0066; H04W 36/0072; H04W 36/0077; H04W 36/0083; H04W 36/08; H04W 36/10; H04W 36/14; H04W 36/18; H04W 36/22; H04W 36/24; H04W 36/30; H04W 36/32; H04W 36/165; H04W 36/385; H04W 48/20; H04W 60/04; H04W 60/06; H04W 72/048; H04W 76/02; H04W 76/028; H04W 76/04; H04W 76/045; H04W 76/06; H04W 76/068; H04W 84/12; H04W 88/06; H04L 12/66; H04L 12/5692; H04L 41/0213; H04L 41/0803; H04L 43/0811; H04L 43/0817; H04L 47/10; H04L 47/14; H04L 49/103; H04L 67/18; H04L 67/22; G07C 2209/63; H04B 7/0632; H04J 3/00; H04J 3/0697; H04J 3/14; H04J 3/26; H04J 3/1694
USPC .......................... 370/310–350; 455/431–444; 709/220–244

See application file for complete search history.

(56) References Cited

U.S. PATENT DOCUMENTS

| | | | | |
|---|---|---|---|---|
| 6,138,021 | A * | 10/2000 | Arrington et al. | ............ 455/436 |
| 7,689,196 | B2 * | 3/2010 | Hutchinson et al. | ........ 455/343.1 |
| 8,725,149 | B2 * | 5/2014 | Motegi et al. | ................. 455/436 |
| 8,934,906 | B2 * | 1/2015 | Pan et al. | ....................... 455/436 |
| 2007/0206552 | A1* | 9/2007 | Yaqub et al. | .................. 370/338 |
| 2010/0062774 | A1 | 3/2010 | Motegi et al. | |
| 2012/0120916 | A1* | 5/2012 | Omori | .......................... 370/331 |
| 2012/0320876 | A1 | 12/2012 | Zhou et al. | |
| 2015/0016412 | A1* | 1/2015 | Horn et al. | .................... 370/331 |

FOREIGN PATENT DOCUMENTS

EP         2 509 386 A1    10/2012

* cited by examiner

*Primary Examiner* — Tri H Phan

(57) ABSTRACT

Systems and methods of performing a handover in a wireless communication network are provided. A controller node can receive a first request to establish a first logical communication link between a first access node and a gateway. The controller node can receive from a second access node a second request to establish a second logical communication link between the second access node and the gateway and to release the first logical communication link between the first access node and the gateway. A timer can be initiated after receiving the second request. The timer can be based on a mobility of the wireless device, a load of the wireless communication network, and an application requirement of an application running on the wireless device. The gateway can be instructed to establish the second logical communication link after initiating the timer and to release the first logical communication link after the timer expires.

20 Claims, 5 Drawing Sheets

METHOD OF PERFORMING HANDOVER IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

A handover procedure can be performed to allow a wireless device to maintain communication with a wireless network. Handover can comprise three phases: handover preparation, handover execution, and handover completion. During the preparation procedure, handover procedures can be negotiated between a first access node (source) and a second access node (target) without any involvement from the evolved packet core (EPC) such that preparation messages can be directly exchanged between the source access node and a target access node. During the execution procedure, a communication link or tunnel such as an X2 interface can be established such that data addressed to the wireless device can be forwarded from the source access node to the target access node. During the handover completion procedure, a logical communication link can be established between a gateway and the target access node such that data addressed to the wireless device can be communicated from the EPC to the target access node. In addition, the initial logical communication link between the EPC and the source access node can be terminated. In addition, the source access node can release context information associated with the wireless device.

When the logical communication link between the EPC and the source access node is terminated too quickly, data addressed to the wireless device via the source access node can be prevented from reaching the target access node causing undesirable service interruptions. When the logical communication link between the EPC and the source access node is maintained too long, handover requests from the wireless device in communication with the target access node can be denied which can also cause undesirable service interruptions.

Overview

Systems and methods of performing a handover in a wireless communication network are provided. A controller node can receive a first request to establish a first logical communication link between a first access node and a gateway. Data addressed to a wireless device in communication with the first access node can be communicated over the first logical communication link. The controller node can receive from a second access node a second request to establish a second logical communication link between the second access node and the gateway such that data addressed to the wireless device is communicated over the second logical communication link and to release the first logical communication link between the first access node and the gateway. A timer can be initiated after receiving the second request. The timer can be based on a mobility of the wireless device, a load of the wireless communication network, and an application requirement of an application running on the wireless device. The gateway can be instructed to establish the second logical communication link with the second access node after initiating the timer. The first access node can be instructed to release the first logical communication link with the gateway after the timer expires.

DETAILED DESCRIPTION

Figure 1:
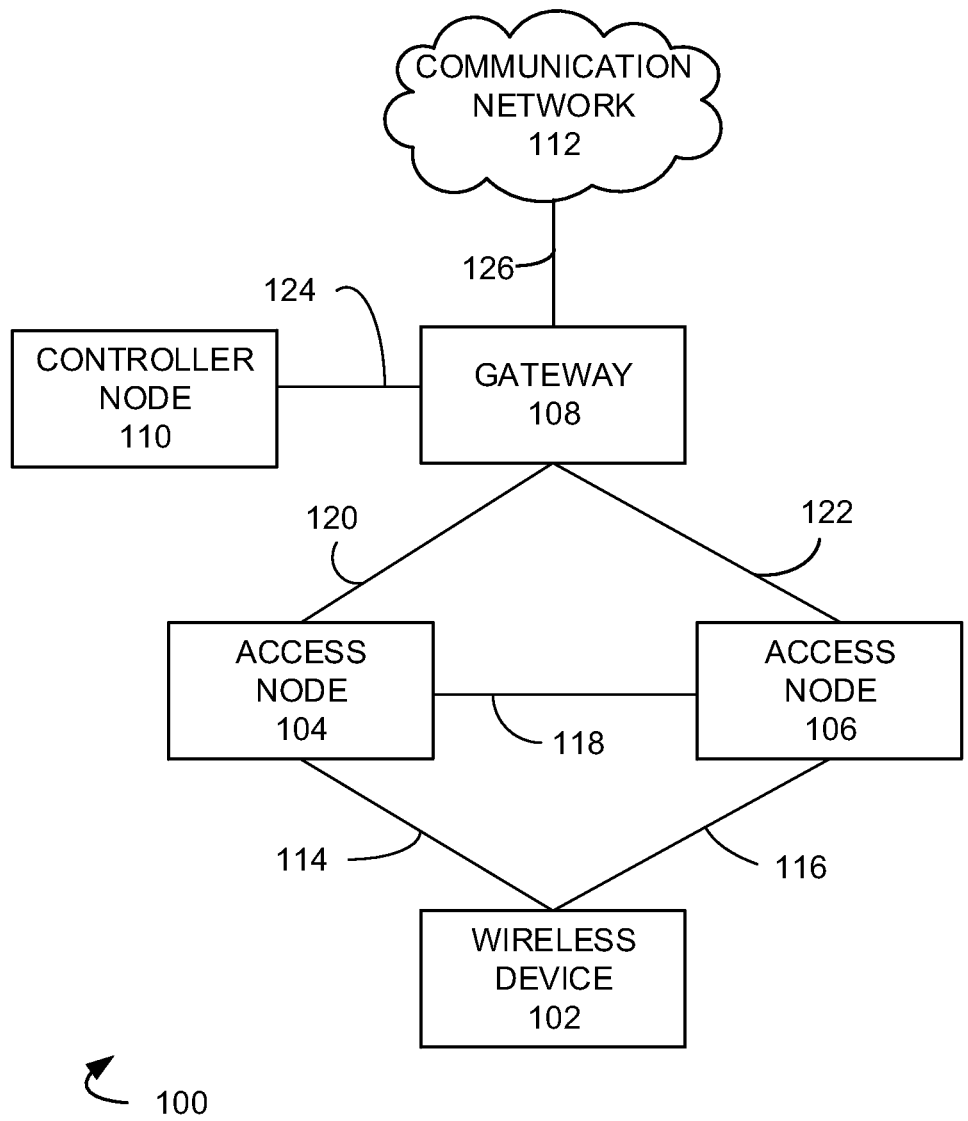
FIG. 1 illustrates a communication system to perform a handover in a wireless communication network.

FIG. 1 illustrates an exemplary communication system 100 for performing a handover in a wireless communication network. Communication system 100 can comprise a wireless device 102, access nodes 104, 106, a gateway 108, a controller node 110, and a communication network 112. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 104, 106 and communication network 112, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104 or 106, any number of wireless devices can be implemented according to various exemplary embodiments disclosed herein.

The wireless interface of wireless device 102 can include one or more transceivers for transmitting and receiving data over communication system 100. Each transceiver can be associated with the same or different frequency bands, the same or different radio access technologies, the same or different network providers, and/or the same or different services. For example, wireless device 102 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 102 can be in communication with access node 104 through communication link 114 or with access node 106 through communication link 116. Links 114, 116 can use various communication media, such as air, space, metal, optical fiber, or some other signal propagation path— including combinations thereof. Communication links 114, 116 may comprise many different signals sharing the same link. Communication links 114, 116 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 104 could share the same representative wireless link, but be transferred over different communication sessions, frequencies, timeslots, packets, ports, sockets, logical transport links, or in different directions—including combinations thereof.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 104, 106 can be any network node configured to provide communication between wireless device 102 and communication network 108. Access nodes 104, 106 can be short range access nodes or standard access nodes. A short range access node could include a microcell base station, a picocell base station, a femtocell base station, or the like and a standard access node could include a base transceiver station, a radio base station, an eNodeB device, or an enhanced eNodeB device, or the like. It is noted that while two access nodes 104, 106 are illustrated in FIG. 1, any number of access nodes can be implemented within system 100.

Access nodes 104, 106 can comprise a processor and associated circuitry to execute or direct the execution of computer-readable instructions to obtain information. Access nodes 104, 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 104, 106 can receive instructions and other input at a user interface.

Gateway 108 can be any network node configured to interface with other network nodes using various protocols. Gateway 108 can communicate user data over system 100. Gateway 108 can be a standalone computing device, computing system, or network component, and can be accessible, for example, by a wired or wireless connection, or through an indirect connection such as through a computer network or communication network. For example, gateway 108 can include a serving gateway (SGW) and/or a public data network gateway (PGW), etc. One of ordinary skill in the art would recognize that gateway 108 is not limited to any specific technology architecture, such as Long Term Evolution (LTE) and can be used with any network architecture and/or protocol.

Gateway 108 can comprise a processor and associated circuitry to execute or direct the execution of computer-readable instructions to obtain information. Gateway 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 108 can receive instructions and other input at a user interface.

Controller node 110 can be any network node configured to communicate information and/or control information over system 100. Controller node 110 can be configured to transmit control information associated with a handover procedure. Controller node 110 can be a standalone computing device, computing system, or network component, and can be accessible, for example, by a wired or wireless connection, or through an indirect connection such as through a computer network or communication network. For example, controller node 110 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 110 is not limited to any specific technology architecture, such as Long Term Evolution (LTE) and can be used with any network architecture and/or protocol.

Controller node 110 can comprise a processor and associated circuitry to execute or direct the execution of computer-readable instructions to obtain information. Controller node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 110 can receive instructions and other input at a user interface.

Access node 104 can be in communication with access node 106 through communication link 118. Access node 104 can be in communication with gateway 108 through communication link 120. Access node 106 can be in communication with gateway 108 through communication link 122. Gateway 108 can be in communication with controller node 110 through communication link 124. Gateway 108 can be in communication with communication network 112 through communication link 126. Communication links 118, 120, 122, 124, 126 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 118, 120, 122, 124, 126 can be a direct link or might include various equipment, intermediate components, systems, and networks.

Communication network 112 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 112 can be capable of carrying data, for example, to support voice, push-to-talk, broadcast video, and data communications by a wireless device such as wireless device 102. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 112 can also comprise additional base stations, controller nodes, telephony switches, internet routers, network gateways, computer systems, communication links, or some other type of communication equipment, and combinations thereof.

Handover between two access nodes can include three phases: handover preparation, handover execution, and handover completion. Measurement reports from a wireless device are used to initiate a handover procedure. For example, when the wireless device initially establishes communication with an access node, the access node can provide the wireless device with a handover condition threshold such as a signal level threshold, etc. When the handover condition meets the threshold, the wireless device can transmit a measurement report to the access node (e.g., the source access node). Based on the measurement report the source access node can determine an access node in which to hand the wireless device over (e.g., the target access node) based on the measurement report. The source access node can directly communicate with the target access node. For example, the source access node can transmit a handover request to the target access node without communicating through the EPC. The handover request can include resource requirement information associated with the wireless device. After receiving resource requirement information, the target access node can establish an uplink logical communication link with an EPC network node. For example, an S1 bearer communication link can be established between the target access node and the gateway. This S1 bearer communication link can allow the wireless device to send uplink information to the EPC via the target access node during the handover procedure. In addition, during the handover preparation, a logical communication link can be established between the source access node and the target access node. For example, an X2 transport bearer can be established. Downlink data addressed to the wireless device can be communicated from the gateway to the source access node to the target access node over the logical communication link between the source access node and the target access node.

After the logical communication link is established between the source access node and the target access node, the handover execution phase can be initiated when the source access node instructs the wireless device to initiate communication with the target access node using a handover command (e.g., RRC Connection Reconfiguration). The wireless device can detach from the source access node thereby releasing communication with the source access node. When the wireless device detaches from the source access node, the wireless device can enter an idle mode (e.g., RRC idle) such that the wireless device does not transmit or receive any data during that time. If data addressed to the wireless device is transmitted by the network, it is sent to the target access node via the source access node and the data is buffered at the target access node until communication is established between the target access node and the wireless device. The wireless device can initiate communication with the target access node and begin establishing communication through synchronization process. The target access node can use the resource requirement information provided by the source access node to assign the required resources and respond to the synchronization request from the wireless device. After the synchronization process is complete, the wireless device can transmit a handover confirmation to the target access node (e.g., RRC Connection Reconfigure Complete) thereby successfully establishing communication between the wireless device and the target access node. The target access node can then transmit downlink data addressed to the wireless device received from the source access node and buffered at the target access node. In addition, the wireless device can transmit any uplink data to the EPC via the target access node.

When communication is successfully established between the wireless device and the target access node, the handover completion phase can be initiated. The target access node can send a request to a controller node, such as a MME, to establish a logical communication link between the gateway and the target access node to allow downlink data addressed to the wireless device to be communicated to the wireless device via the target access node rather than to the source access node and over the X2 communication link. For example, this request can be a path switch request message. After receiving the request, the controller node can instruct the gateway to establish a logical communication link (e.g., a downlink S1 bearer link) with the target access node to allow downlink data addressed to the wireless device to be directly communicated to the target access node from the EPC. When the logical communication link is established between the gateway and the target access node, an indication can be sent to the source access node that data addressed to the wireless device will no longer be transmitted to the source access node. For example, the gateway can send an "end marker" packet to indicate the last packet addressed to the wireless device sent to the source access node. That packet is transmitted from the gateway to the source access node and to the target access node via the communication link between the source access node and the target access node. After the target access node receives the "end marker" packet, the target access node can begin transmitting data addressed to the wireless device received over the logical communication link between the gateway and the target access node. After data addressed to the wireless device is transmitted directly to the target access node from the EPC, the controller node can send an acknowledgement message, such as a path switch request acknowledgement, to the target node indicating that the logical communication link between the target access node and the gateway has been established. After the target node receives the acknowledgement message, the target node can instruct the source access node to release context information associated with the wireless device thereby causing the source access node to release the logical communication link with the gateway and the communication link with the target access node.

In operation, a controller node 110 can receive a first request to establish a first logical communication link between a first access node 104 and a gateway 108. Data addressed to wireless device 102 can be communicated over the first logical communication link. The first request can be initiated when the wireless device initially establishes communication with access node 104 or during a handover procedure where access node 104 is the target access node. The controller node can receive from a second access node 106 a second request to establish a second logical communication link between access node 106 and gateway 108. In addition, the second request can include a request to release the first logical communication link between access node 104 and the gateway 108. The second request can be initiated by access node 104 receiving a measurement report from wireless device 102 indicating that a handover threshold has been met. A timer can be initiated after receiving the second request. The timer can be based on a mobility of the wireless device, a network load of the wireless communication network, and an application requirement of an application running on the wireless device. The controller node can instruct gateway 108 to establish the second logical communication link with access node 106 after initiating the timer. The controller node 110 can further instruct access node 104 to release the first logical communication link with gateway 108 after the timer expires. For example, the controller node 110 can send an acknowledgement message, such as a path switch request acknowledgement, to access node 106 and access node 106 can instruct access node 104 to release the context information associated with wireless device 102. When the context information is released, the first logical communication link and the communication link between access nodes 104 and 106 can be terminated.

Figure 2:
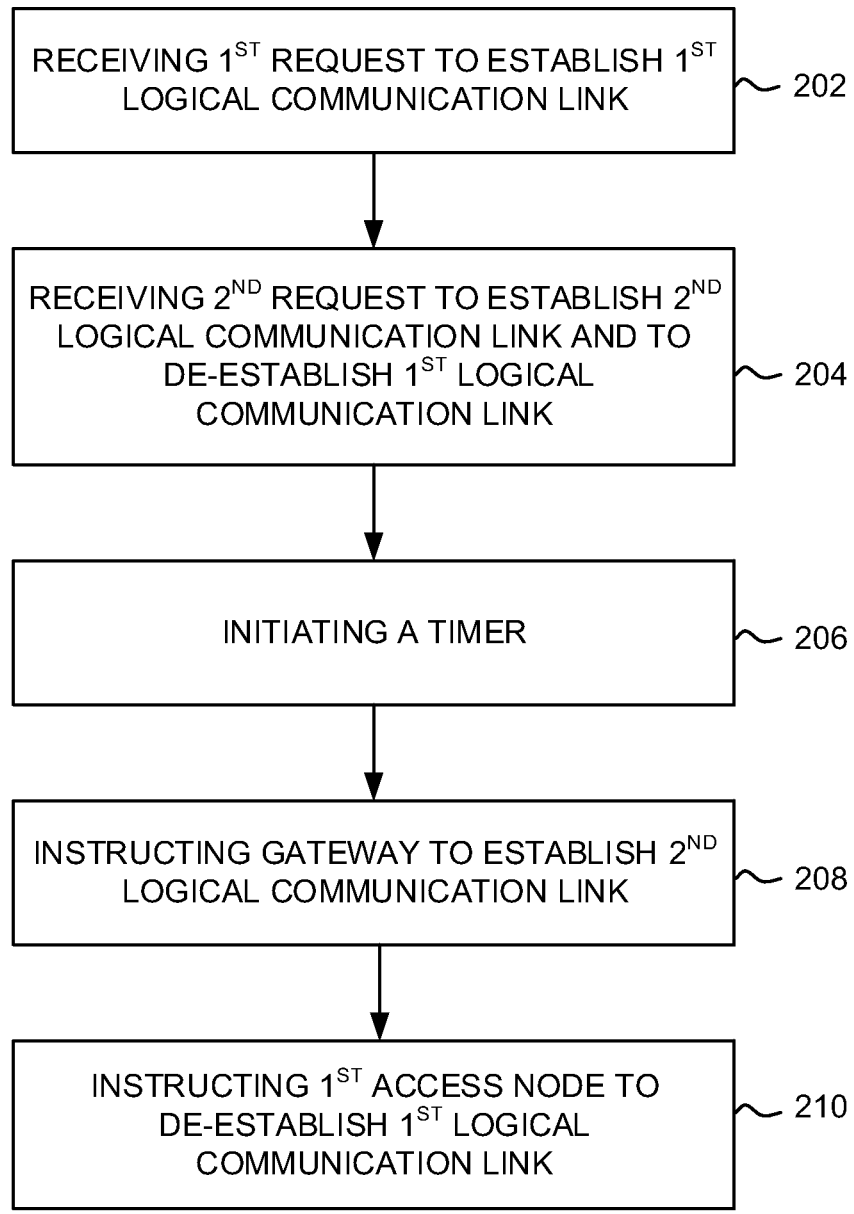
FIG. 2 illustrates an exemplary method of performing a handover in a wireless communication network.

FIG. 2 illustrates a flow chart of an exemplary method of performing a handover in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a network node can receive a first request to establish a first logical communication link. For example, when wireless device 102 initially establishes communication with access node 104 (i.e., upon initialization or during a handover procedure), a request to establish a first logical communication link between access node 104 and gateway 108 can be transmitted to controller node 110. After the first logical communication link is established, data addressed to wireless device 102 can be communicated from the EPC to the wireless device over the first logical communication link via access node 104.

A network node can receive a second request to establish a second logical communication link and to release the first logical communication link at 204. For example, after a handover preparation phase and a handover execution phase, controller node 110 can receive the second request from access node 106. The second request can be any message indicative of establishing the second logical communication link and releasing the first logical communication link, such as a path switch request message. The second logical communication link can allow data addressed to wireless device 102 to be transmitted from the EPC to the wireless device 102 via gateway 108 and access node 106.

At 206, a timer can be initiated. For example, controller node 110 can initiate a timer after receiving the second request from access node 106. The timer can have a time period that is determined based upon a mobility of the wireless device, a load of the wireless communication network, and an application requirement of an application running on the wireless device. The mobility of the wireless device comprises an indication of at least one of a location of the wireless device 102, a direction in which the wireless device 102 is moving, and a speed at which the wireless device 102 is moving. The load of the wireless communication network can comprise at least one of a transmission load and a processing load. In addition, timestamps can be kept for each network element involved in the path switch process. These timestamps can be used to estimate the expected time duration for the path switch to be complete. The application requirement of an application running on the wireless device can be based on at least one of a minimum data rate, a maximum permitted data delay, a minimum throughput, a minimum error rate, a maximum data loss rate, an application type, and a modulation and coding scheme. Moreover, the timer can further be based on past handover durations between access node 104 and 106. For example, when handover procedures have been previously performed between access node 104 and 106, a time duration to complete the handover procedure can be stored at a network node. The previous handover procedures can be associated with wireless device 102 or other wireless devices. In addition, the handover procedure could have been performed from access node 104 to access node 106 or from access node 106 to access node 104.

In an exemplary embodiment, the controller node 110 can monitor the mobility of wireless device and monitor the network and processing load of all network elements involved in establishing the second logical communication link. Each time a message is sent during the process of establishing the second logical communication link, the message can be time stamped and the time stamp can be communicated to controller node 110. Controller node 110 can determine the load of the network and/or the processing load of each network node based on the time stamp. For example, controller node 110 can compare the time stamp with predetermined times based on anticipated transmission times for each message. When the time stamp meets a threshold, the controller node 110 can modify the time period of the timer. For instance, when the time stamp is less than an anticipated value, the controller node 110 can decrease the time period and when the time stamp is greater than an anticipated value, the controller node 110 can increase the time period. The controller node 110 can continually monitor and adjust the timer during the handover procedure. In addition, the controller node 110 can further pull information associated with applications requirements of applications running on the wireless device from a packet inspection tool. For example, traffic type and/or quality of service information of the active packet flows addressed to wireless device 102 can be monitored in order to determine a time period for the timer.

In another exemplary embodiment, when it is determined that wireless device 102 has a high mobility, the timer duration can be reduced to allow for a faster handover procedure to the next target access node. When it is determined that wireless device 102 is ping ponging, the timer duration can be increased to decrease the amount of ping ponging and overhead because any additional handover requests received before the timer expires are denied. In addition, current network and processing loading conditions can influence the amount in which timer duration is modified. For example, if the wireless device 102 is running a high quality of service application such as VoIP, the timer duration can be increased to avoid undesirable service interruptions. Alternatively, if the wireless device 102 is running a low quality of service application, the predetermined timer duration set by the network operator or protocol can be used.

The network node can instruct the gateway to establish the second logical communication link at 208. For example, controller node 110 can instruct gateway 108 to establish the second logical communication link with access node 106 such that data addressed to wireless device 102 can be transmitted over the second logical communication link. The instruction can be any message indicating that the second logical communication link is to be established, such as a modify bearer request message. In addition, controller node 110 can instruct access node 106 to deny any handover requests initiated by wireless device 102 after wireless device 102 establishes communication with access node 106 and before the first logical communication link is released in order to prevent the wireless device from ping-ponging between access nodes while a handover procedure is initiated.

At 210, the network node can instruct the first access node to release the first logical communication link after the timer expires. For example, controller node 110 can send a message, such as a path switch request acknowledgement message, to access node 106 after the timer expires acknowledging that the second logical communication link has been established. Access node 106 can then send a message, such as a context release message, to access node 104 instructing access node 104 to release the context information associated with wireless device 102. Context information can comprise technical characteristics or requirements to establish and/or maintain communication links with the current network (e.g., communication links between the access node and the gateway and/or between access nodes) or technical characteristics or requirements to establish and/or maintain the communication service for wireless device 102 or a user of wireless device 102. Characteristics of the communication link can include information regarding an access technology used for the communication link, data rate for transmission, information regarding error coding or error protection, information associated with a communication channel to be used, timeslot, frequency, access node, etc. In addition, context information can include initial wireless device context such as E-RAB context, a security key, a handover restriction list, radio capability associated with wireless device 102, and/or security capabilities associated with wireless device 102.

In an exemplary embodiment, the controller node can receive an indication that wireless device 102 is receiving data addressed to the wireless device 102 over the second logical communication link before the timer expires and before instructing the first access node to release the first logical communication link. For example, gateway 108 can continue to send data addressed to wireless device 102 over the first logical communication link such that the data addressed to wireless device 102 is sent to access node 104 over the first logical communication link and over a communication link established between access node 104 and access node 106 before access node 106 transmits the data addressed to wireless device 102. After establishing the second logical communication link, gateway 108 can insert an indication, such as an "end marker" packet, at the end of the data addressed to the wireless device sent over the first logical communication link. After the indication is sent, gateway 108 transmits any data addressed to the wireless device 102 over the second logical communication link Access node 106 buffers any data addressed to wireless device 102 transmitted over the second logical communication link until access node 106 receives the "end marker" packet over the communication link with access node 104. When access node 106 receives the "end marker" packet, access node 106 begins to transmit data addressed to the wireless device 102 sent over the second logical communication link and stored in the buffer. The controller node 110 can send the path switch request acknowledgement after access node 106 begins to transmit data addressed to wireless device 102 that was sent over the second logical communication link.

Figure 3:
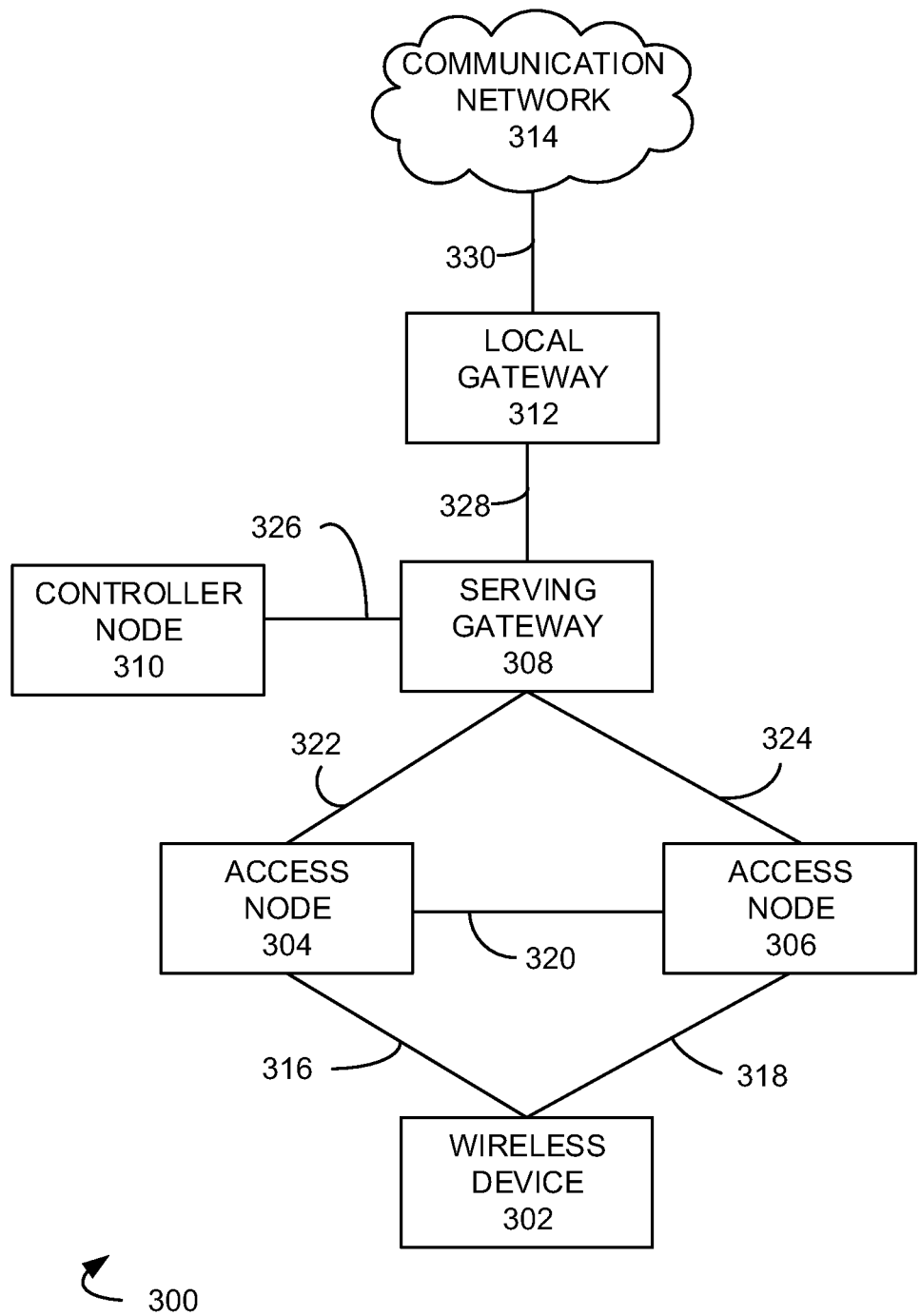
FIG. 3 illustrates another communication system to perform handover in a wireless communication network.

FIG. 3 illustrates an exemplary communication system 300 for performing a handover in a wireless communication network. Communication system 300 can comprise a wireless device 302, access nodes 304, 306, a serving gateway 308, a controller node 310, a local gateway 312, and a communication network 314. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 304, 306 and communication network 314, which are omitted for clarity, including additional processing nodes, routers, gateways, and physical and/or wireless data links for carrying data among the various network elements.

Wireless device 302 can be any device configured to communicate over communication system 300 using a wireless interface. For example, wireless device 302 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 3 as being in communication with access node 304 or 306, any number of wireless devices can be implemented according to various exemplary embodiments disclosed herein.

The wireless interface of wireless device 302 can include one or more transceivers for transmitting and receiving data over communication system 300. Each transceiver can be associated with the same or different frequency bands, the same or different radio access technologies, the same or different network providers, and/or the same or different services. For example, wireless device 302 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 302 can be in communication with access node 304 through communication link 316 or with access node 306 through communication link 318. Links 316, 318 can use various communication media, such as air, space, metal, optical fiber, or some other signal propagation path— including combinations thereof. Communication links 316, 318 may comprise many different signals sharing the same link Communication links 316, 318 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 302 and access node 304 could share the same representative wireless link, but be transferred over different communication sessions, frequencies, timeslots, packets, ports, sockets, logical transport links, or in different directions—including combinations thereof.

Wireless device 302 can transmit and/or receive information over system 300 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 304, 306 can be any network node configured to provide communication between wireless device 302 and communication network 314. Access nodes 304, 306 can be short range access nodes or standard access nodes. A short range access node could include a microcell base station, a picocell base station, a femtocell base station, or the like and a standard access node could include a base transceiver station, a radio base station, an eNodeB device, or an enhanced eNodeB device, or the like. It is noted that while two access nodes 304, 306 are illustrated in FIG. 3, any number of access nodes can be implemented within system 300.

Access nodes 304, 306 can comprise a processor and associated circuitry to execute or direct the execution of computer-readable instructions to obtain information. Access nodes 304, 306 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 304, 306 can receive instructions and other input at a user interface.

Serving gateway 308 can be any network node that routes and forwards data addressed to a wireless device. In addition, serving gateway 308 can act as a mobility anchor for wireless device 102 during handovers between different frequencies and/or different radio access technologies supported by the same access node. Gateway 308 can be a standalone computing device, computing system, or network component, and can be accessible, for example, by a wired or wireless connection, or through an indirect connection such as through a computer network or communication network. One of ordinary skill in the art would recognize that gateway 308 is not limited to any specific technology architecture, such as Long Term Evolution (LTE) and can be used with any network architecture and/or protocol.

Gateway 308 can comprise a processor and associated circuitry to execute or direct the execution of computer-readable instructions to obtain information. Gateway 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 308 can receive instructions and other input at a user interface.

Controller node 310 can be any network node configured to communicate information and/or control information over system 300. Controller node 310 can be configured to transmit control information associated with a handover procedure. Controller node 310 can be a standalone computing device, computing system, or network component, and can be accessible, for example, by a wired or wireless connection, or through an indirect connection such as through a computer network or communication network. For example, controller node 310 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 310 is not limited to any specific technology architecture, such as Long Term Evolution (LTE) and can be used with any network architecture and/or protocol.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 310 can receive instructions and other input at a user interface.

Local gateway 312 can be any network node configured to interface with other network nodes using various protocols. Gateway 312 can communicate user data over system 300. Gateway 312 can be a standalone computing device, computing system, or network component, and can be accessible, for example, by a wired or wireless connection, or through an indirect connection such as through a computer network or communication network. For example, gateway 312 can include a public data network gateway (PGW), etc. One of ordinary skill in the art would recognize that gateway 312 is not limited to any specific technology architecture, such as Long Term Evolution (LTE) and can be used with any network architecture and/or protocol.

Gateway 312 can comprise a processor and associated circuitry to execute or direct the execution of computer-readable instructions to obtain information. Gateway 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 312 can receive instructions and other input at a user interface.

Access node 304 can be in communication with access node 306 through communication link 320. Access node 304 can be in communication with serving gateway 308 through communication link 322. Access node 306 can be in communication with gateway 308 through communication link 324. Serving gateway 308 can be in communication with controller node 310 through communication link 326. Serving gateway 308 can be in communication with local gateway 312 through communication link 328. Local gateway 312 can be in communication with communication network 314 through communication link 330. Communication links 320, 322, 324, 326, 328, 330 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 320, 322, 324, 326, 328, 330 can be a direct link or might include various equipment, intermediate components, systems, and networks.

Communication network 314 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 314 can be capable of carrying data, for example, to support voice, push-to-talk, broadcast video, and data communications by a wireless device such as wireless device 302. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 314 can also comprise additional base stations, controller nodes, telephony switches, internet routers, network gateways, computer systems, communication links, or some other type of communication equipment, and combinations thereof.

Figure 4:
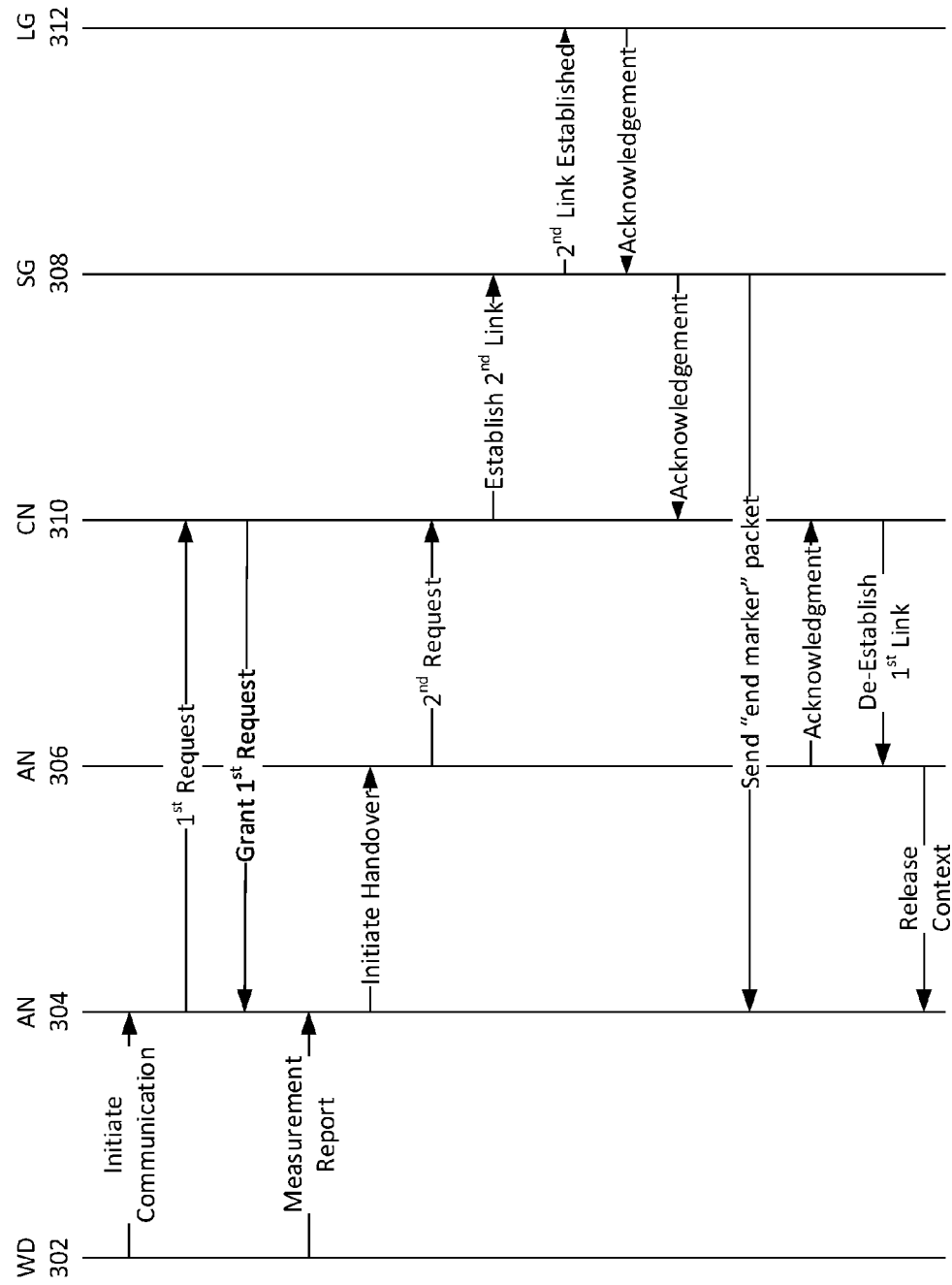
FIG. 4 is an exemplary signaling diagram that illustrates an exemplary method of performing a handover in a wireless communication network.

FIG. 4 is an exemplary signaling diagram that illustrates an exemplary method of performing a handover in a wireless communication network. The signal diagram will be discussed with reference to the exemplary communication system 300 illustrated in FIG. 3. However, the signaling diagram can be implemented with any suitable communication system. In addition, although FIG. 4 depicts signaling performed in a particular order for purposes of illustration and discussion, the signaling discussed therein is not limited to any particular order. Moreover, additional signaling not included in FIG. 4 can also be performed.

To start, wireless device 302 initiates communication with access node 304. Access node 304 can send a first request to controller node 310 to establish a first logical communication link between access node 304 and gateway 308. Controller node 310 can grant the first request and data addressed to wireless device 302 can be communicated over the first logical communication link via access node 304.

When wireless device 302 sends a measurement report to access node 304, access node 304 can determine to initiate a handover procedure. Access node 304 can negotiate handover preparation procedures with access node 306. Access node 306 can send a second request to the controller node 310 to establish a second logical communication link between access node 306 and gateway 310 such that data addressed to wireless device 102 can be communicated over the second logical communication link and to release the first logical communication link between access node 304 and gateway 310.

Controller node 310 can determine a timer duration for a release time associated with the first logical communication link after receiving the second request and initiate the timer. The timer duration can be based on a mobility of the wireless device, a load of the wireless communication network, and an application requirement of an application running on the wireless device. Controller node 310 can send instructions to gateway 308 to establish the second logical communication link. The instruction message can be time stamped to estimate the time for path switch to be completed.

Gateway 308 can send a message to gateway 312 indicating that the second logical communication link has been established. Again, this message can be time stamped and the time stamp communicated to controller node 310 to estimate the path switch duration. Gateway 312 can send additional messages to other network nodes in the system such as an indication of IP-CAN session modification (CCR) where this message can also be time stamped and the time stamp communicated to controller node 310 to estimate the path switch duration. In response, gateway 312 can acknowledge that the second logical communication link has been established and gateway 308 can acknowledge that data addressed to the wireless device 302 can now be communicated over the second logical communication link. Both messages can be time stamped and the time stamp communicated to controller node 310 to estimate the path switch duration. Gateway 308 can send an "end marker" packet to access node 304 over the first logical communication link to indicate the last packet addressed to the wireless device 302 over the first logical communication link Access node 306 can send an acknowledgement message to controller node 310 to indicate that the "end marker" packet has been received through the communication link between the access node 304 and access node 306. When the "end marker" acknowledgement is received before the timer duration has elapsed, controller node 310 can send instructions to access node to release the first logical communication link. After the timer duration has elapsed, access node 306 can send a message to access node 304 to release context information associated with wireless device 302 thereby terminating the first logical communication link.

Figure 5:
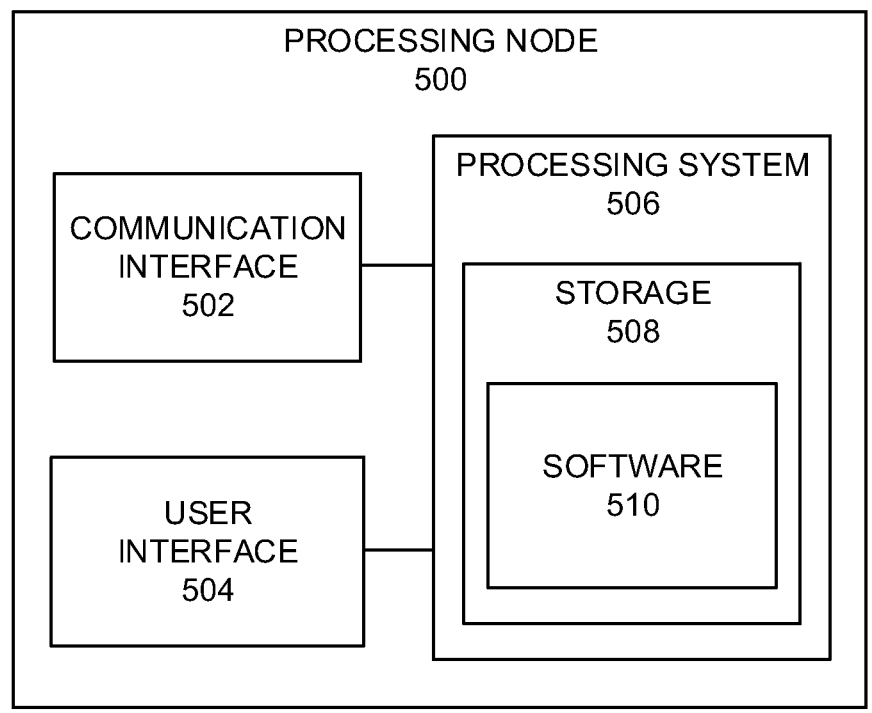
FIG. 5 illustrates a processing node according to an exemplary embodiment.

FIG. 5 illustrates an exemplary processing node 500 in a communication system. Processing node 500 comprises communication interface 502, user interface 504, and processing system 506 in communication with communication interface 502 and user interface 504. Processing node 500 is capable of monitoring communications in a communication network. Processing system 506 includes storage 508, which can comprise a disk drive, flash drive, memory circuitry, or other memory device. Storage 508 can store software 510 which is used in the operation of the processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 can permit processing node 500 to communicate with other network elements. User interface 504 can permit the configuration and control of the operation of processing node 500.

Examples of processing node 500 include access nodes 104, 106, 304, 306, gateways 108, 308, 312, and controller nodes 110, 310. Processing node 500 can also be an adjunct or component of a network element, such as an element of access nodes 104, 106, 304, 306, gateways 108, 308, 312, and controller nodes 110, 310. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of performing a handover in a wireless communication network, comprising:
   receiving at a controller node a first request to establish a first logical communication link between a first access node and a gateway such that data addressed to a wireless device in communication with the first access node is communicated over the first logical communication link;
   receiving at the controller node from a second access node a second request to establish a second logical communication link between the second access node and the gateway such that data addressed to the wireless device is communicated over the second logical communication link and to release the first logical communication link between the first access node and the gateway;
   initiating a timer after receiving the second request, wherein the timer is based on a mobility of the wireless device and a load of the wireless communication network;
   instructing the gateway to establish the second logical communication link with the second access node after initiating the timer; and
   instructing the first access node to release the first logical communication link with the gateway after the timer expires.

2. The method of claim 1, wherein initiating the timer after receiving the second request is further based on an application requirement of an application running on the wireless device.

3. The method of claim 1, wherein the load of the wireless communication network is based on a timestamp of a message sent from the gateway to the controller node.

4. The method of claim 1, wherein the timer is further based on past handover durations between the first access node and the second access node.

5. The method of claim 1, further comprising:
   instructing the second access node to deny any handover request from the wireless device before the timer expires.

6. The method of claim 1, further comprising:
   receiving an indication that the wireless device is receiving data addressed to the wireless device transmitted over the second logical communication link before the timer expires.

7. The method of claim 6, wherein releasing the first logical communication link comprises:
   instructing the first access node to release context information associated with the wireless device after the indication that the wireless device is receiving data transmitted over the second logical communication link.

8. The method of claim 1, wherein the mobility of the wireless device comprises an indication of at least one of a location of the wireless device, a direction in which the wireless device is moving, and a speed at which the wireless device is moving.

9. The method of claim 1, wherein the load of the network comprises at least one of a transmission load and a processing load.

10. The method of claim 1, wherein the application requirement of the wireless device comprises at least one of a minimum data rate, a maximum permitted data delay, a minimum throughput, a minimum error rate, a maximum data loss rate, an application type, and a modulation and coding scheme.

11. A system for performing a handover in a wireless communication network, comprising:
    a processing node configured to
       receive a first request to establish a first logical communication link between a first access node and a gateway such that data addressed to a wireless device in communication with the first access node is communicated over the first logical communication link;
       receive from a second access node a second request to establish a second logical communication link between the second access node and the gateway such that data addressed to the wireless device is communicated over the second logical communication link and to release the first logical communication link between the first access node and the gateway;
       initiate a timer after receiving the second request, wherein the timer is based on a mobility of the wireless device and a load of the wireless communication network;
       instruct the gateway to establish the second logical communication link with the second access node after initiating the timer; and
       instruct the first access node to release the first logical communication link with the gateway after the timer expires.

12. The system of claim 11, wherein the timer is further based on an application requirement of an application running on the wireless device.

13. The system of claim 11, wherein the timer is further based on the load of the wireless communication network and on timestamps of messages sent between the gateway and the controller node, wherein the timestamps are used to estimate a duration to establish the second logical communication link with the second access node.

14. The system of claim 11, wherein the timer is further based on past handover durations between the first access node and the second access node.

15. The system of claim 11, wherein the processing node is further configured to
    instruct the second access node to deny any handover request from the wireless device before the timer expires.

16. The system of claim 11, wherein the processing node is further configured to
    receive an indication that the wireless device is receiving data addressed to the wireless device transmitted over the second logical communication link before the timer expires.

17. The system of claim 16, wherein the processing node is further configured to
    instruct the first access node to release context information associated with the wireless device after the indication that the wireless device is receiving data transmitted over the second logical communication link.

18. The system of claim 11, wherein the mobility of the wireless device comprises an indication of at least one of a location of the wireless device, a direction in which the wireless device is moving, and a speed at which the wireless device is moving.

19. The system of claim 11, wherein the load of the network comprises at least one of a transmission load and a processing load.

20. The system of claim 11, wherein the application requirement of the wireless device comprises at least one of a minimum data rate, a maximum permitted data delay, a minimum throughput, a minimum error rate, a maximum data loss rate, an application type, and a modulation and coding scheme.

\* \* \* \* \*